United States Patent [19]

Lecron et al.

[11] Patent Number: 5,002,598
[45] Date of Patent: Mar. 26, 1991

[54] PROCESS OF MAKING MULTIFILAMENT GLASS STRAND

[75] Inventors: Jacques Lecron, Challes; Maxime Manera, Jacob Bellecombette; Jean-Paul Faure, Chignin; Jean-Pierre Renaudin, Cognin, all of France

[73] Assignee: Société Vetrotex Saint-Gobain, Chambery, France

[21] Appl. No.: 296,306

[22] Filed: Jan. 6, 1989

Related U.S. Application Data

[60] Division of Ser. No. 555,126, Jan. 9, 1984, abandoned, which is a division of Ser. No. 374,478, May 3, 1982, Pat. No. 4,437,869, which is a continuation-in-part of Ser. No. 207,712, Nov. 17, 1980, abandoned.

[30] Foreign Application Priority Data

May 14, 1981 [FR] France .................. 81 09633

[51] Int. Cl.⁵ .................................... C03B 37/022
[52] U.S. Cl. .................................... 65/2; 65/12; 425/76; 425/463; 428/399
[58] Field of Search .............. 65/1, 2, 12; 425/76, 425/463; 428/399

[56] References Cited

U.S. PATENT DOCUMENTS

| | | | |
|---|---|---|---|
| 2,825,260 | 3/1958 | O'Brien | 350/96.25 |
| 2,965,925 | 12/1960 | Dietzsch | |
| 3,019,078 | 1/1962 | Roberson | 65/1 X |
| 3,425,454 | 2/1969 | Eakins et al. | 428/397 |
| 4,348,217 | 9/1982 | Williamson et al. | 65/2 |

FOREIGN PATENT DOCUMENTS

| | | | |
|---|---|---|---|
| 419485 | 4/1972 | U.S.S.R. | |
| 964459 | 7/1964 | United Kingdom | 161/177 |
| 2053889 | 2/1981 | United Kingdom | |

OTHER PUBLICATIONS

Undated publication entitled Forming Glass Filaments with Unusual Cross Sections, R. A. Humphry, DeBell & Richardson, Hazzardville, Or., pp. 77.2–77.8.

*Primary Examiner*—Robert L. Lindsay
*Attorney, Agent, or Firm*—John T. Synnestvedt; Charles H. Lindrooth; Peter J. Cronk

[57] ABSTRACT

The application discloses an apparatus and a process for the manufacture of continuous fibers by mechanical attenuation. It is especially useful in obtaining a strand composed of a mixture of filaments of differing cross sections in constant and definite proportion. This is obtained by employment of a bushing having a lower surface comprising a multiplicity of fiberizing centers of varying configurations, each fiberizing center being formed by a zone perforated by a group of orifices from which at least one filament can be attenuated in a stable manner. The strands produced are particularly adapted for the reinforcement of plastic materials.

14 Claims, 4 Drawing Sheets

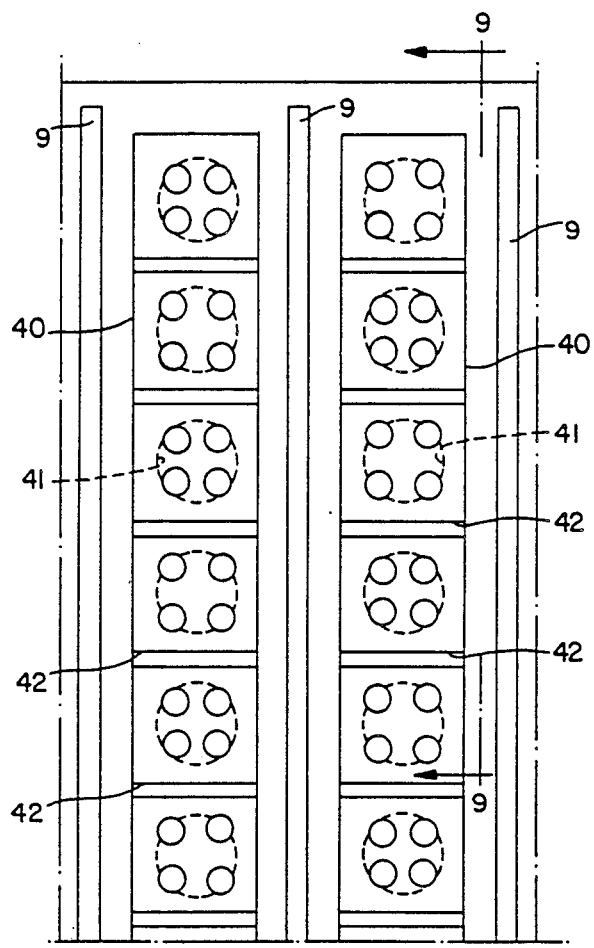
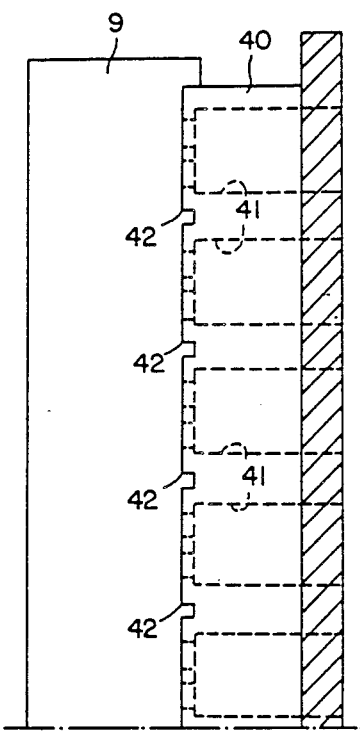

PROCESS OF MAKING MULTIFILAMENT GLASS STRAND

This is a divisional of abandoned, co-pending application Ser. No. 06/555,126 filed on Jan. 9, 1984 which is a division, of application Ser. No. 374,478, filed May 3, 1982 now U.S. Pat. No. 4,437,869 which is a continuation-in-part of application Ser. No. 207,712, filed Nov. 17, 1980, abandoned.

BACKGROUND AND STATEMENT OF OBJECTS

This invention relates to apparatus and a method for the manufacture of continuous fibers or filaments from mineral thermoplastic materials such as glass, obtained by mechanical attenuation of the molten material flowing from a plurality of orifices situated at the base of a bushing. The invention is especially concerned with a process for the manufacture of glass threads or strands composed of a plurality of filaments of differing cross sections.

The filaments generally obtained by mechanical attenuation of streams of glass issuing from a plurality of identical orifices normally have substantially identical circular cross sections due to the high surface tension of the molten glass. Consequently, when these filaments are gathered together to form a thread, the filaments are separated by numerous gaps which substantially reduce the compactness of the said thread.

The use of such a thread as reinforcing elements for thermosetting or thermoplastic synthetic organic materials does not enable as much glass to be incorporated in these materials as would be desirable for improving their mechanical properties. This limitation may be overcome by assembling filaments of differing cross-sectional shape or filaments whose cross-sectional areas are identical but not circular.

The manufacture of filaments having non-circular cross sections has been described in particular in the article by R. A. Humphrey, entitled "Forming Glass Filaments with Unusual Cross Sections" (7th International Glass Conference - Brussels 1965).

According to the above-mentioned article, filaments of rectangular or hexagonal cross section, for example, may be obtained by a process similar to that used for the manufacture of optical fibers.

A rod or preform of the desired cross section is used as starting material, and its lower end is softened in order to draw it out into a sufficiently fine filament in which the initial cross section is preserved on a reduced scale.

This process requires the previous manufacture of the preform and very precise control of the forming temperatures. Its discontinuous and small scale character does not enable it to be envisaged for exploitation on a large industrial scale.

Another process is called to mind in the description given in U.S. Pat. Nos. 2,758,951 and 2,906,656 relating to the manufacture of a composite material.

The apparatus for carrying out the process described in these patents comprises a bushing provided in its lower part with two series of different circular orifices alternating regularly in a single longitudinal row. A plurality of filaments of circular contour with differing cross sections is attenuated from these orifices in such a manner as to form a sheet of parallel filaments wherein each filament of large diameter is surrounded by several filaments of smaller diameter. The sheet is rolled up on a drum on which are formed up to several hundreds of successive layers. Apart from an approximate indication of the diameter of the orifices, no precise information is given as to the operating conditions of such a bushing.

The French patent published under the No. 1,341,710 describes a process for the production of filaments having a non-circular cross section from a bushing with conventional tips.

This process consists in establishing contact between the surface of the glass as it leaves the orifice and a cooled surface. The viscosity of the glass increases locally under the cooling effect so that the resulting deformation of the glass becomes set. A wide variety of filaments with non-circular cross section can be obtained in this manner.

Apart from the difficulties of operating such an installation, it is obvious that the number of filaments delivered from each bushing is very small since each tip must be equipped with a deformation device which takes up a far from negligible amount of space. Such a solution is only of limited industrial interest.

The present invention has as its object a fiberizing apparatus and process for obtaining a continuous strand or thread composed of a large number of filaments of differing cross sections.

It is a particular object of the present invention to obtain from a given fiberizing apparatus a thread composed of a mixture of filaments of differing cross sections in constant and definite proportions chosen so as to increase the degree of compactness of the said thread.

These objects are achieved by the use of a novel form of bushing in a fiberizing installation as defined below.

The fiberizing installation essentially comprises a source of supply of thermoplastic material such as glass connected to a bushing heated by Joule's effect, a device for blowing gas directed towards the bottom of the bushing, and attenuating means, the lower surface of the bottom of said bushing having a multiplicity of fiberizing centers of differing configuration, each fiberizing center being formed by a zone perforated by a group of orifices from which at least one filament may be attenuated in a stable manner.

By "fiberizing centers of differing configurations" are meant zones perforated by groups of orifices which are distinguished from each other, in one or more ways, such as the nature of the metal alloy of which they are constituted and/or by the number of orifices and/or by the cross section of the orifices and/or by the distance separating the orifices.

According to one characteristic of the invention, these fiberizing centers are regularly arranged on the bottom of a bushing consisting of a substantially continuous plate.

According to another characteristic of the invention, these fiberizing centers are arranged at the bottoms of bosses provided on the bushing, the walls of which bosses encircle at least one alveole or internal cell.

Starting from a bushing having fiberizing centers of differing configuration, the manufacturing process according to the invention consists of regulating the heating of the bushing and/or cooling the bottom of said bushing in such a manner as to bring the glass to a temperature at which the formation of one filament per orifice in a certain number of predetermined fiberizing centers takes place simultaneously with the formation of one filament per group of orifices in other fiberizing centers.

BRIEF DESCRIPTION OF DRAWINGS

The invention is described in detail below with reference to the accompanying drawings, in which:

FIGS. 8 and 9 are views illustrating still another embodiment of bushing, FIG. 9 being taken as indicated by the line 9—9 on FIG. 8.

DETAILED DESCRIPTION OF DRAWINGS

Figure 1:
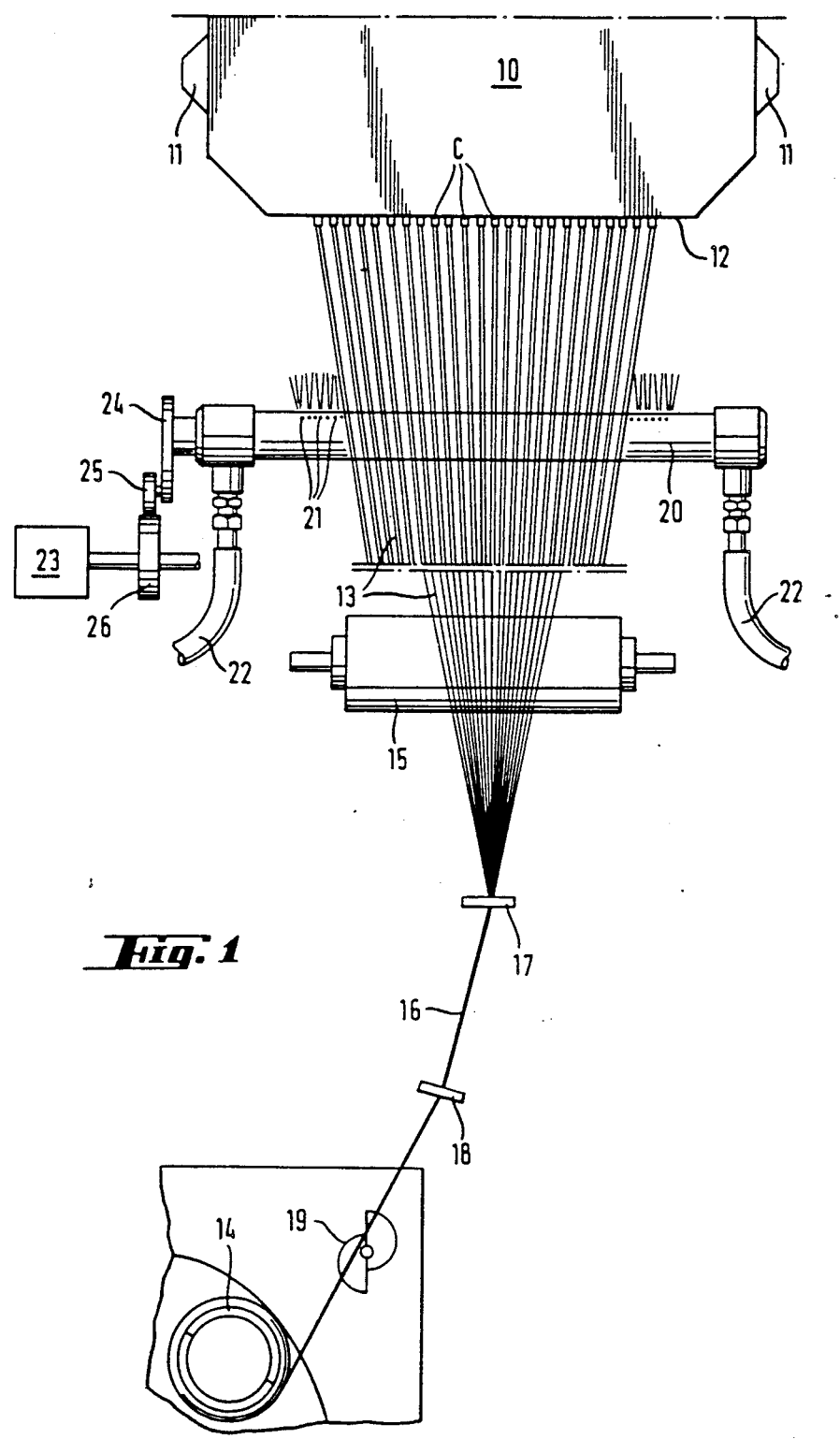
FIG. 1 is an elevational view from which certain parts have away and which constitutes a schematic illustration of a fiberizing installation equipped with a bushing according to the invention.

Reference will first be made to FIG. 1 which represents by way of example the general layout of a fiberizing apparatus equipped with a bushing according to the invention.

The bushing 10, generally made of an alloy of 90% platinum, 10% rhodium, has terminals 11 for the supply of an electric current for heating by Joule's effect. The bushing contains molten glass which flows through orifices which are grouped into a plurality of fiberizing centers diagrammatically indicated at C arranged on the lower surface of the bottom wall 12 of a bushing. Cooling fins 9 may be provided between adjoining fiberizing centers. The bushing communicates with a source of glass supply of known type which may be either the forehearth of a direct melting furnace from which the glass flows directly into the bushing in the molten state or a supply system delivering glass in the form of marbles which are subsequently melted in the bushing. Whichever source of supply is used, the flow of glass through the orifices is ensured essentially by the hydrostatic pressure of the molten mass above the bottom wall. The glass is attenuated into elementary filaments—in the conventional manner with the aid of a rotating spindle 14. After application of sizing by means of a sizing application indicated schematically at 15, the sizing coated filaments are gathered together into one or more threads 16 by the usual devices employed in this technique, such as combs 17 and 18. The thread is subsequently wound round the rotating spindle 14 along which it is displaced under the influence of a distributing device or helical guide 19.

A blowing manifold 20 equipped, for example, with a series of apertures 21 is installed close to and below the fiberizing plane, with the apertures 21 directed towards the bottom of the bushing. The said apertures may be in the form of nozzles or orifices situated very close together and arranged parallel to the longitudinal axis of the bushing. The pipe is connected to a source of gas (not shown) by tubes 22.

It may be mounted to be fixed, rotatable or capable of oscillation. In the latter case illustrated in FIG. 1, one of the ends of the pipe 20 is connected to a motor by an arm 24 equipped with a roller 25 applied to the surface of a cam 26 fixed to the motor shaft. Other blower devices may be employed.

Depending on the structure and arrangement of the various fiberizing centers distributed over the bottom of the bushing, the flow of gas directed towards the lower surface of the bottom or plate 12 of the bushing is used either only at the moment of starting of the fiberizing operation or throughout the whole duration of this operation.

The number of filaments attenuated per bushing and the distribution of filaments according to their cross section may be determined by the structure of the various fiberizing centers C and their arrangement on the bottom 12 of the bushing.

Thus, a bushing according to the invention comprises at least two sets of fiberizing centers so that it is possible at one and the same time to attenuate a single filament from certain fiberizing centers and a plurality of filaments from other fiberizing centers.

The structures may differ simply in the interaxial distance between the orifices and/or in the number of orifices and/or the cross section of the orifices in one fiberizing center as compared to another center.

Figure 2:
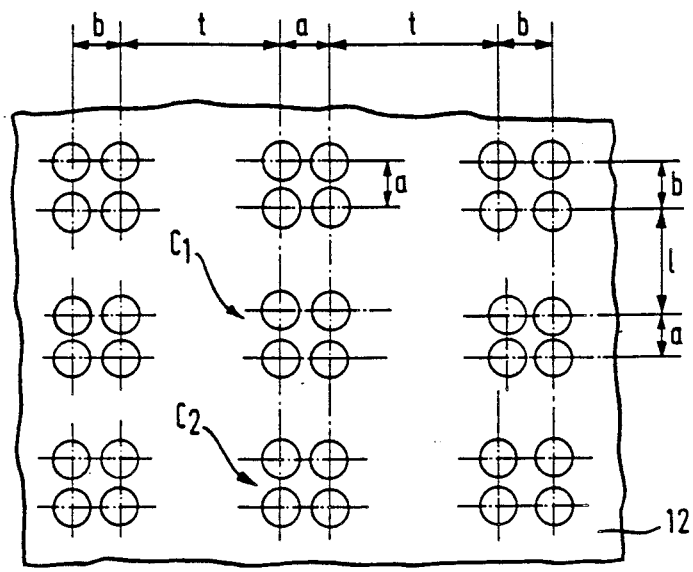
FIG. 2 is a plan view on an enlarged scale of part of the lower surface of a first example of the bottom of a bushing according to the invention.

Thus, the bottom wall 12 may be a flat plate perforated with a plurality of groups of orifices, each group forming a fiberizing center, as shown by way of example in FIG. 2. Each of the fiberizing centers $C_1$ and $C_2$ illustrated has four circular orifices of the same diameter arranged at the corners of a square. The fiberizing centers are distinguished solely by the distances a and b separating the centers of two adjacent orifices. The fiberizing centers $C_1$ and $C_2$, distributed in a staggered arrangement, form rows separated by a distance t, and two successive centers in the same row are separated by a distance l. The centers $C_1$ and $C_2$ could alternatively be distinguished by the number of orifices and/or the cross section of the orifices.

The differences in configuration may also involve the relative positions of the orifices on the plate.

The bushing bottom 12 may have a series of bosses projecting below the bottom of said wall, with the walls of the bosses encircling at least one internal cell or alveole at the base of which are situated the different fiberizing centers.

FIGS. 3 to 9 illustrate some examples of bosses having different forms.

The form of the bosses is preferably geometrically simple, for example, it may be prismatic as in the bosses $B_1$ and $B_2$ which have four plane lateral surfaces (FIGS. 3 to 5), or cylindrical (FIGS. 6 and 7), or of elongated rectangular form (FIGS. 8 and 9).

The one or more lateral walls are preferably vertical, and the external lower surface of the said bosses at the base of each alveole is a regularly shaped surface, preferably substantially flat or planar.

Figure 3:
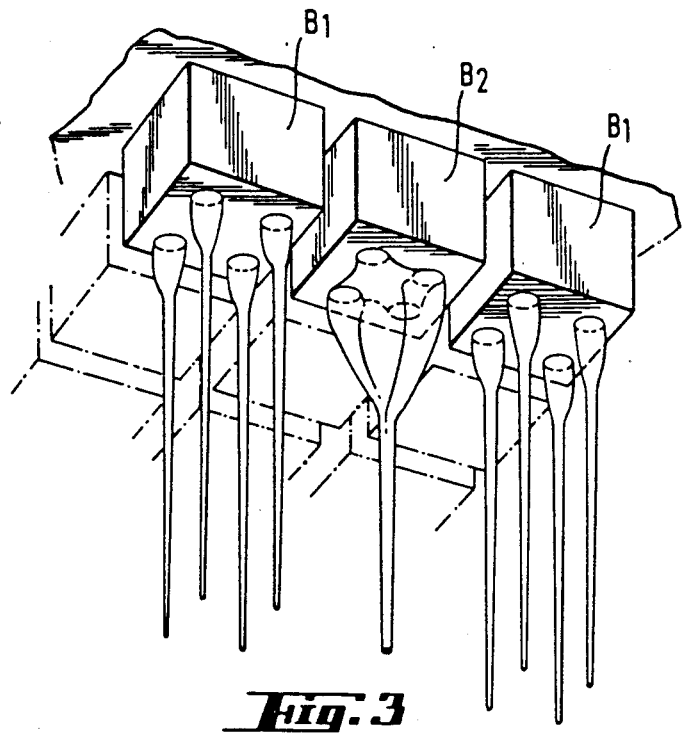
FIG. 3, which illustrates a second example of bushing according to the invention, is a view in perspective of part of the bottom of the bushing with bosses having internal cells or alveoles.
Figure 4:
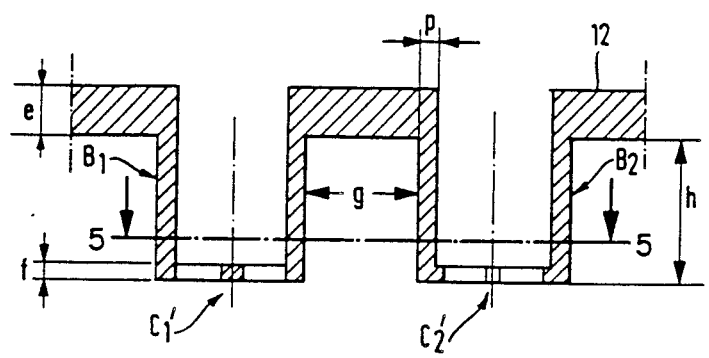
FIG. 4 is a vertical section through the bosses shown in FIG. 3.
Figures 5, 6:
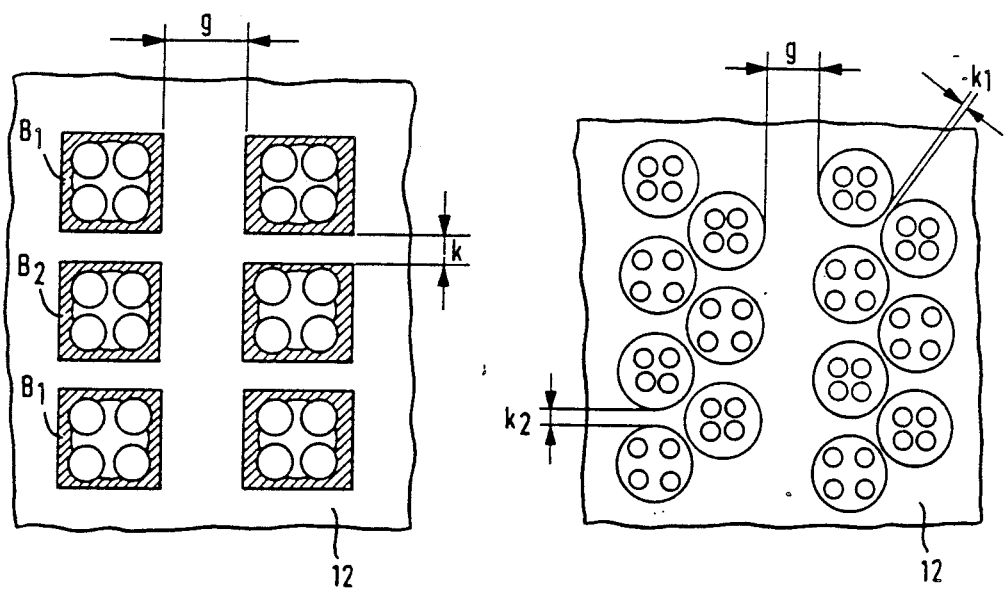
FIG. 5 is a horizontal section taken on the section line 5—5 through the bosses shown in FIG. 4.
FIG. 6 is a bottom view of another type of bushing having cylindrical bosses.

The bosses illustrated in FIGS. 3, 4 and 5 are distinguished solely by the distance separating the orifices.

Figure 7:
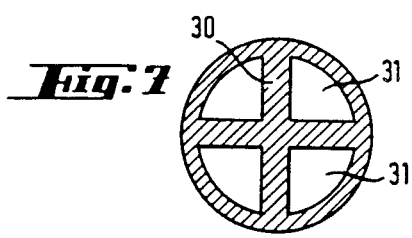
FIG. 7 is a horizontal section through still another type of boss.

FIG. 7 illustrates another example of a fiberizing center. It represents the lower part of a cylindrical boss spanned by a cross 30 which defines four orifices 31 in the form of quadrants. This form of orifice enables fibers of non-circular cross section to be obtained. This type of fiberizing center associated with other fiberizing centers, such as those represented in FIG. 6, for example, may be used to produce a mixture in constant and specified proportions of filaments of circular and noncircular cross section.

FIGS. 3 to 7 show bosses each having a single alveole.

The bushings according to the invention may alternatively be provided with bosses having an elongated rectangular cross section instead of a square cross section. A bushing of this configuration is illustrated in FIGS. 8 and 9. Here, the elongated rectangular bosses are indicated at 40. Each of these bosses is provided with a plurality of internal alveoles 41 in the bottom of which the orifices are provided in order to provide the desired fiberizing zones. In this embodiment, the orifices may be arranged as in FIG. 5, with different spacing in different alveoles according to a regularly repeated pattern and for each alveole are regularly arranged with respect to the central vertical axis of each alveole. Shallow grooves 42 may be cut into the lower external surface of this type of boss to separate two adjacent fiberizing zones. Cooling fins 9 may also be included in the arrangement of FIGS. 8 and 9.

The differences in structure of the fiberizing centers may also apply to the nature of the material constituting the lower external surface of each perforated zone, the choice of this material being determined by the degree to which it can be wetted by the molten glass. A bushing according to the invention may, therefore, have different fiberizing centers whose lower external surfaces will be wetted differently according to the nature of the material of which these surfaces are made.

Thus, the bushings according to various of the embodiments of the invention may also be formed with different surface characteristics in different zones, providing at least two types of perforated zones, one characterized by an angle of contact with the molten glass at 1150° C. of more than 60° and the other by an angle of contact below 50°. For this purpose, either the bushing alloy may be different in different zones or a coating may be applied to the lower external surface of certain of the perforated zones.

In the case of bushings with bosses, two different alloys may be used to produce either in whole or in part two series of bosses. For example, a bushing of this type may be equipped with two series of cylindrical bosses, the bosses of one series consisting entirely of an alloy of 90% platinum and 10% rhodium and those of the other series of an alloy of 93% platinum, 3% iridium and 4% gold. This latter alloy is marketed by COMPTOIR-LYON-ALEMAND-LOUYOT of 13 rue de Montmorency, 75003 Paris, France under the reference PR ¾. The angle of contact of E glass on a plate of the ternary alloy last mentioned is 75° whereas on a plate of platinum with 10% rhodium, it is only 39° under the same conditions.

The differentiation of the fiberizing centers may also be obtained by the deposition of a coating on the external surface of certain perforated zones. This coating may be deposited by any means suitably adapted to the said zones according to whether they are arranged on a bushing with a substantially flat bottom or with bosses.

For example, a bushing according to the invention may be equipped with two series of bosses, the bosses of one series having its lower external surface covered with a coating or deposit of boron nitride which is characterized by wetting characteristics similar to those of the above-mentioned ternary alloy while the others are made of an alloy of platinum with rhodium.

The bosses are arranged at regular intervals on the bottom of the bushing, as illustrated in FIGS. 3, 5, 6 and 8.

For example, prismatic bosses having a single alveole, such as $B_1$ or $B_2$, are arranged in groups each forming a row perpendicular to the longitudinal axis of the bushing. Cylindrical bosses are advantageously staggered and grouped in double rows as shown in FIG. 6. The spacing g between two successive groups is sufficient for the insertion of a cooling device such as, for example, a conventional cooling fin, as above referred to in connection with FIG. 1.

The mode of operation of the bushings according to the invention is described below, a distinction being made between bushings with a substantially flat bottom and bushings with bosses.

For flat bottomed bushings, as shown in FIG. 2, equipped, for example, with two categories of fiberizing centers $C_1$ and $C_2$, the operation is started as follows:

Hot glass flows through the assembly of orifices and progressively coats virtually the whole lower surface of the fiberizing plate.

With the aid of the gas flow permanently directed against the bottom of the bushing, the operator separates the mass of glass formed on the said bottom and brings about the subdivision of the glass coating into a multiplicity of small coatings each of which is limited to a perforated zone corresponding to one "fiberizing center".

At the end of this first phase, the operator attenuates one filament per fiberizing center at a low speed. The temperature of the glass bulbs is subsequently lowered by the action of the gas flow to reach a temperature $\theta_1$ below which threshold the filaments attenuated from the fiberizing centers $C_1$ subdivide into as many filaments as there are orifices in each fiberizing center. The filaments attenuated from the fiberizing centers $C_2$ are not affected by this operation. The temperature of the bulbs of the various filaments attenuated in this manner is stabilized to a fiberizing temperature T which is below the temperature $\theta_1$ but above a temperature $\theta_2$ below which the filaments attenuated from the centers $C_2$ would undergo a subdivision tending towards the attenuation of one filament per orifice for all the fiberizing centers. The temperature T is preferably stabilized at a value close to $\frac{1}{2}(\theta_1+\theta_2)$.

For any bushing provided for the manufacture of continuous glass fibers by mechanical attenuation, the temperature of the bulbs varies slightly from one point of the bushing to another and/or with time. To take into account these fluctuations about a mean value and obtain stable operationof the bushings according to the inventio, it is desirable that the temperature difference $\Delta\theta=\theta_1-\theta_2$ should be at least equal to 30° C.

This value is obtained by suitable choice of the dimensional characteristics of the various fiberizing centers.

For bushings with bosses according to the invention, comprising, for example, two series of fiberizing centers $C'_1$ and $C'_2$, the mode of operation is as follows:

At the beginning, the molten glass supplying the bushing passes through the alveoles, flows through the various orifices perforating the lower external surface of the bosses, and rapidly coats the said surface. This flow results in the formation of one or more globular masses per boss, and these globules progressively descend under the action of their own weight, carrying in their wake a glass filament. This phase may be accelerated by manual intervention. The filaments thus forged are gathered together and mechanically attenuated at a low speed. A current of gas, preferably air, is then arranged to sweep over the bottom of the bushing. In the same way as in substantially flat bottomed bushings, the temperature of the bulbs of the filaments is lowered by the action of the gas current. It reaches a temperature $\theta'_1$, below which the filaments attenuated from fiber-forming centers $C'_1$ subdivide into as many filaments as there are orifices in the fiberizing centers.

As in the bushings described above, the temperature of the bulbs of the various attenuated filaments is stabilized at a temperature T' between the temperature limits $\theta'_1$ and $\theta'_2$, the latter temperature corresponding to the limit below which the filaments attenuated from the centers $C'_2$ would undergo subdivision.

The filaments thus obtained are gathered together into one or more than one strand or thread which is wound over a rotating support, and in the process of attenuation of the said filament as usually carried out, the gas current is stopped when winding of the thread is begun. It is equally possible, however, to reduce the flow of gas current and continue to sweep the bottom of the bushing with the current during the whole fiberizing operation.

For the same reasons as set forth above, the temperature T' is preferably stabilized at a value close to $\frac{1}{2}(\theta'_1+\theta'_2)$ and the temperature difference $\Delta\theta'$ should be at least equal to 30° C.

This difference $\Delta\theta'$ is obtained by suitable choice of the dimensional characteristics of the bosses, in particular height h and the thickness p of their side wall, as well as the thickness f of the floor surrounding the orifices of the various fiberizing centers.

Cooling of the glass, obtained simply by radiation and by convection between the walls of the bosses and the ambient gas circulating in the spaces between the bosses and carried along by the filaments in the course of attenuation, enables the glass leaving the various orifices to be at a uniform temperature. This cooling may, if desired, be reinforced and adjusted by the insertion of cooling elements such as fins between the rows of bosses, as already described above.

The distribution of the orifices is governed by the various distances separating the fiberizing centers and, for each center, by the distances between the orifices.

Whether the bushing has a flat bottom or bosses, the distance from edge to edge of orifices belonging to one and the same fiberizing center may vary from 1 mm to 0.2 mm or even less but is preferably in the region of 0.2 to 0.5 mm.

Different types of bushings are distinguished according to the distances separating any two adjacent fiberizing centers.

For substantially flat bottomed bushings, these distances, referred to as t and l in FIG. 2, should be equal to or greater than 1.5 times the diameter of those orifices which have the greatest cross section in the bushing in question.

For bushings with bosses, the distances between adjacent fiberizing centers is determined by the distances separating two adjacent bosses.

The bosses may be arranged in single or double rows perpendicularly to the longitudinal axis of the bottom of the bushing, as illustrated in FIGS. 5 and 6. In these figures, the longitudinal axis of the bushing is indicated by the line x—x. In each single row, the bosses are separated by a distance k which should be at least equal to 0.1 mm but is preferably from 0.4 to 1 mm. If a staggered arrangement is used (as in FIG. 6), the distances $k_1$ and $k_2$ separating, respectively, two adjacent bosses belonging to the same row and two adjacent bosses belonging to two different rows, should also be at least equal to 0.1 mm but are preferably from 0.4 to 1 mm.

The space g between two single or double rows is sufficient to enable an element or fin of the cooling device to be inserted. This distance may vary from 2.5 to 5.5 mm and is preferably 3.5 to 4 mm.

One particular advantage of the use of bosses arranged in this manner in single or double rows is that the electric current for heating the bushing circulates mainly in the flat bottom between the bosses rather than in the walls of the bosses, with the result, that the thickness of the lower perforated wall of the bosses may be chosen independently of the electric characteristics of the bushing considered as a whole. Consequently, even the bushings according to the invention having bosses, have electric characteristics similar to those of conventional bushings with tips without having the disadvantages of the tips.

Certain important dimensional characteristics are illustrated in FIG. 4, namely, the thicknesses e and f corresponding, respectively, to the bottom of the bushing and that of the bosses, the height h and the thickness p of the lateral wall of the bosses. The choice of these characteristics is governed essentially by the phenomena of electric energy dissipated by Joule's effect, the mechanical resistance of the bushing, the heat exchange phenomena, the rate of flow of glass per orifice and the number of orifices per unit surface area.

With a view to conferring sufficient mechanical resistance to the bottom of the bushing while at the same time using as little of the metal as possible, the thickness e varies from 0.5 to 3 mm and is preferably 1 to 2 mm.

This thickness, which is determined independently of the dimensional characteristics of the boss, may vary from one zone to another of the bottom and is chosen so that the distribution of electric current may be as uniform as possible over the whole bottom of the bushing.

The thickness f which partly determines the pull rate of glass may vary independently of other dimensional characteristics. By choosing very small thicknesses, the frictional resistance in the orifices is reduced to a minimum so that high pull rates may be obtained from orifices of small diameter. This thickness f may vary from 0.2 to 2 mm and is preferably from 0.4 to 1 mm as a function of the diameter of the orifices.

The degree of cooling of the glass depends primarily on the height h and thickness p of the lateral wall of the bosses.

The thickness p may be constant, for example, if the boss is cylindrical. On the other hand, it may vary within a horizontal plane is bosses which have an external parallelepiped rectangular form contain an internal cell or alveole which is substantially cylindrical, as shown in FIG. 5.

In general, it may be said that for the bushings according to the invention, "h" varies from 1 to 10 mm and "p" from 0.2 to 2 mm, preferably from 0.4 to 1 mm.

The importance and advantages of the process and the apparatus described above is further illustrated by the following Examples, which describe use of some particular embodiments of the bushings according to the invention.

EXAMPLE 1

The bottom of the bushing consists of a flat plate of platinum containing rhodium (90% platinum -10% rhodium) and it comprises two categories of fiberizing centers such as those represented in FIG. 2.

The various dimensional characteristics of the bushing are as follows:

Thickness e = 1 mm
Diameter of orifices = 1.60 mm
Distances
  a = 1.80 mm
  b = 2.10 mm
  l = 3.65 mm
  t = 6.15 mm.

Four filaments are obtained at the centers $C_1$ and one filament at the centers $C_2$ under the following conditions.

When the fiberization is carried out in the absence of a gas current, stable operation is obtained when the temperature T of the filament bulbs is between the temperature limits $\theta_1$ and $\theta_2$ which are, respectively, 1230° C. and 1190° C.

When the gas current is maintained throughout the fiberizing operation, a stable operation is obtained when the temperature T is between $\theta_1 = 1250°$ C. and $\theta_2 = 1210°$ C.

When the bottom of the bushing is continuously swept with air under pressure, four filaments 15 μm in diameter are obtained at the $C_1$ type centers and at the same time, one filament 30 μm in diameter at the $C_2$ type centers if the following fiberizing conditions are employed:

Temperature of bulbs of glass T = 1240° C.
Attenuation speed = 10 meters/sec.

EXAMPLE 2

The bottom of the bushing consists of a bottom wall of 90% platinum -10% rhodium and comprises two categories of fiberizing centers arranged at the base of a series of bosses provided on the bottom wall. The latter are identical to those represented in FIGS. 3 to 5. They are arranged in rows of alternating $B_1$ and $B_2$ type bosses.

The various dimensional characteristics of the bushing are as follows:

Thickness
  of the bottom wall of the bushing e = 1.5 mm
  of the bottom of the boss f = 0.5 mm
Distance between two adjacent bosses
  in the same row k = 1 mm
  between two rows g = 3.5 mm
Cross section of bosses = 4.6 × 4.6 mm
  Height of bosses h = 4.5 mm
  Diameter of orifices = 1.6 mm
Edge to edge distance between two adjacent orifices
  $B_1$ boss = 0.5 mm
  $B_2$ boss = 0.2 mm.

In the absence of a gas blast, there are obtained, simultaneously, four filaments at the $B_1$ bosses and one filament at the $B_2$ bosses when the temperature T' of the bulbs of the filaments is between $\theta'_1 = 1240°$ C. and $\theta'_2 = 1200°$ C.

Thus, for example, with a temperature at the bulb of 1220° C. and a velocity of 10 meters/sec., filaments 20 and 40 μm in diameter are obtained simultaneously.

The examples given above show that the bushings according to the invention may be used to obtain threads composed of a mixture of filaments of different cross sections in constant and definite proportions.

Although the equipment according to this invention is particularly adapted to the manufacture of multifilament strands embodying filaments of different cross sections, it is of advantage that various forms of the equipment may alternatively be employed to produce multifilament strands in which the strands are all of the same cross section. This may be achieved by operating at fiberizing temperatures above $\theta_1$ (or $\theta'_1$) or below $\theta_2$ (or $\theta'_2$). In this way, all of the fiberizing zones would either be flooded or none of them would be flooded, and this would result in producing either one filament from each fiberizing zone or alternatively one filament from each orifice. In either event, all of the filaments would be of the same cross section.

We claim:

1. A drawing method for the manufacture, by mechanical attenuation, of strand from continuous filaments formed substantially from a molten glass supplied from a bushing heated by the Joule effect, the lower surface of which bushing is perforated by a large number of orifices forming a plurality of groups distributed in zones according to a regularly repeated pattern, the orifices in some of said zones being circular and the orifices of other of said zones being non-circular, the method comprising delivering the molten glass through said orifices; blowing a gas towards the bottom of the bushing to reduce the temperature of the delivered molten glass to below that required to flood at least a portion of the zones of said non-circular orifices and attenuating filaments of circular and non-circular cross section from said zones of orifices of circular and non-circular cross section respectively, and gathering the filaments so formed into a strand composed of a mixture of said filaments of circular and non-circular cross section.

2. The method of claim 1, wherein at least one of said groups produces a single filament from a plurality of orifices.

3. The method of claim 2, wherein at least a second of said groups produces a separate filament corresponding to each orifice of said group.

4. The method of claim 3, wherein said first group comprises a smaller edge-to-edge distance between said orifices than said second group.

5. The method of claim 3, wherein said first group comprises a larger number of orifices per unit of surface area than said second group.

6. The method of claim 3, wherein the bushing surfaces of said first group comprise a molten glass contact angle which is greater than the molten glass contact angle of the bushing surfaces of said second group.

7. A drawing process for manufacturing continuous filaments formed substantially from a molten glass having a melt temperature of at least about 1150° C. and supplied from a heated bushing, the lower surface of said bushing comprising a plurality of orifices, at least a portion of said orifices comprising a non-circular configuration, wherein said process comprises delivering the molten glass through said orifices; blowing a gas towards the bottom of said bushing to reduce the temperature of said delivered molten glass below that required to flood a bushing region containing non-circular orifices; and attenuating said filaments from said plurality of orifices to produce continuous filaments having both circular and non-circular cross-sections.

8. The process of claim 7, wherein said blowing step comprises directing a cooling gas close to and below a fiberizing plane of said bushing.

9. The process of claim 8, wherein said cooling gas is provided by a blowing manifold comprising a series of apertures directed towards the bottom of the bushing.

10. The process of claim 9, wherein said apertures are directed substantially parallel to a longitudinal axis of the bushing.

11. The process of claim 7, wherein said blowing step is employed throughout the duration of said process.

12. The process of claim 7, wherein said bushing comprises cooling fins for reducing a localized temperature for a portion of the lower surface of said bushing.

13. A process for the manufacture of strand from continuous filaments formed substantially from a molten glass supplied from a heated bushing, the lower surface of said bushing being perforated by a large number of orifices forming a plurality of groups distributed in zones according to a regularly repeated pattern, the orifices in some of said zones being circular and the orifices of other of said zones being non-circular, said process comprising delivering said molten glass through said orifices to produce a plurality of glass bulbs at said orifices, blowing a gas towards the bottom of the bushing to cool said glass bulbs to a temperature below that required to flood at least a portion of said zones containing non-circular orifices with glass; and attenuating said filaments of circular and non-circular cross-section from said zones of circular and non-circular cross-section respectfully, and gathering the filaments so formed into a strand composed of a mixture of said filaments of circular and non-circular cross-section.

14. A drawing process for the manufacture, by mechanical attenuation, of a strand from continuous filaments formed substantially from a molten glass supplied from a heated bushing, in which a surface of said bushing is perforated by a large number of orifices forming a plurality of groups distributed in zones according to a regularly repeated pattern, the method comprising delivering the molten glass through said orifices, blowing a cooling gas towards said surface of the bushing to reduce the delivered glass temperature below that required to flood a portion of said zones of orifices with glass, and attenuating a plurality of filaments of different cross-sectional configurations from said zones, and gathering the filaments so formed into a strand composed of a mixture of said different cross-sectional configured filaments.

* * * * *

UNITED STATES PATENT AND TRADEMARK OFFICE
CERTIFICATE OF CORRECTION

PATENT NO. : 5,002,598

DATED : March 26, 1991

INVENTOR(S) : Jacques Lecron, Maxime Manera, Jean-Paul Faure, Jean-Pierre Renaudin It is certified that error appears in the above-identified patent and that said Letters Patent is hereby corrected as shown below:

Col. 3, line 6, after "have" and before "away" insert --been broken--

Col. 3, end of line 51 and beginning of line 52, change "filaments-in" to --filaments 13--

Col. 6, line 52, change "operationof" to --operation of--

Col. 6, line 53, change "inventio," to --invention,--

Col. 7, line 1, change "forged" to --formed--

Col. 7, line 10, change "arc" to --are--

Col. 8, line 57, change "is" to --if--

Col. 12, line 6 (Claim 13, line 17, change "respectfully" to --respectively--

Signed and Sealed this

First Day of September, 1992

Attest:

DOUGLAS B. COMER

Attesting Officer

Acting Commissioner of Patents and Trademarks